United States Patent [19]

Maxwell et al.

[11] 3,864,737

[45] Feb. 4, 1975

[54] DATA RECORDERS

[75] Inventors: David James Maxwell, Bracknell; Frank Richard Towner, Wokingham, both of England

[73] Assignee: Sperry Rand Limited, London, England

[22] Filed: Aug. 29, 1973

[21] Appl. No.: 392,707

[30] Foreign Application Priority Data

Sept. 6, 1972 Great Britain .................... 41232/72

[52] U.S. Cl. .................................. 360/63, 360/134

[51] Int. Cl. .......................................... G11b 15/12

[58] Field of Search ............ 360/13, 63, 64, 74, 78, 360/134

[56] References Cited

UNITED STATES PATENTS

| | | | |
|---|---|---|---|
| 2,933,319 | 4/1960 | Proctor | 360/78 |
| 3,440,630 | 4/1969 | Niquette | 360/74 |
| 3,461,249 | 8/1969 | Kamoji et al. | 360/74 |
| 3,539,734 | 11/1970 | Tsuchiya | 360/74 |
| 3,644,683 | 2/1972 | Braun | 360/13 |

*Primary Examiner*—Vincent P. Canney
*Attorney, Agent, or Firm*—Samuel C. Yeaton; Howard P. Terry; Albert B. Cooper

[57] ABSTRACT

A simple, effective and economic arrangement of detecting a predetermined position on a recording medium of a data recorder. A data recorder disclosed comprises a movable magnetic recording medium in the form of a base material with a coating of magnetic material thereon, the magnetic material being removed from the base material at a plurality of areas spaced in the direction of movement of the recording medium, and sensing means operable to sense the presence of said areas and produce a signal indicative thereof.

7 Claims, 3 Drawing Figures

DATA RECORDERS

BACKGROUND OF THE INVENTION

1. Field of the Invention

This invention relates to data recorders and more particularly, although not exclusively, to flight data acquisition recorders.

The fundamental function of a flight data or "crash" recorder is, of course, reliably to record data fed to it so that the data can be read back when required. This in itself presents no great problems but since in a crash recorder it is necessary to record flight data continually over a considerable period of time, difficulties can arise in switching from one track to another on the magnetic recording medium at a predetermined instant when employing, for example, an endless loop of magnetic recording tape. It is necessary to sense relatively accurately a given position on the recording tape in order that data is switched at the predetermined instant to the track next due to have new data recorded thereon, which is normally the track containing the oldest data. A similar problem exists when instead of the loop of tape being moved in the same direction to give the so-called "endless loop" system, the direction of movement of the tape is periodically reversed or recycled in the "recycling" system; the instant of tape reversal has to be controlled with the same order of accuracy as the track switching in continuous loop systems.

2. Prior Art

In prior crash recorders track switching or tape reversal has been initiated following the closing of electrical contacts by an electrically conductive portion provided on the magnetic tape. This electrically conductive portion has been in the form of a separate metallic strip attached to the tape and in the form of a metallised or plated area integral with the tape but however constituted, it has been found to increase in electrical resistance, to the extent of often going open-circuit, after a relatively short period of use whereby erratic or complete loss of signals result. In addition the electrically conductive portion is open to foreign matter giving rise to contact contamination and also, contact "bounce" which can occur is undesirable.

An alternative method of track switching or tape reversal used in prior crash recorders employs a photosensitive device, such as photo transistor, in conjunction with a translucent or transparent portion of the magnetic tape but in this case, it has been found that under extreme temperature conditions, which have to be tolerated by some crash recorders, the photo transistors become damaged thereby rendering them unacceptable for use in such recorders.

SUMMARY OF THE INVENTION

According to the present invention a data recorder comprises a movable magnetic recording medium in the form of a base material with a coating of a magnetic material thereon, the magnetic material being removed from the base material at a plurality of areas spaced in the direction of movement of the recording medium, and sensing means operable to sense the presence of said areas and produce a signal indicative thereof.

The signal produced by the sensing means may be used to effect track switching in the case of a recording medium in the form of an endless loop of multi-track magnetic tape or tape reversal in a recycling recorder.

Conveniently, part of the sensing means is provided by the normal magnetic heads employed in the recorder thereby effecting a saving in components. Preferably, a set of three heads for each data track is employed to provide respective data ERASE, WRITE and MONITOR functions in that order, as seen in the direction of movement of the tape, and the MONITOR head is arranged to detect a fault condition in the absence of recorded data for a given period of time, typically five seconds. Thus the MONITOR heads act as the sensing means to detect the absence of magnetic material from said areas (which is seen by the head as absence of data) and in conjunction with logic circuitry, for example, produce said signal. If the dimension of said areas in the direction tape movement is made to represent say one third of a second in time, the logic circuitry can be made to distinguish from the fault condition and to await the passage of all said areas beneath the MONITOR head before producing said signal.

Preferably, said areas are spaced in the direction of tape movement a predetermined amount whereby the sensing means can distinguish from unintentional absence of data arising from tape contamination or other phenomena in as much as it is unlikely that contamination etc., will occur at intervals spaced in accordance with said predetermined amount. However, to reduce this likelihood to insignificant proportions, the recording medium preferably has three areas of magnetic material removed therefrom at a predetermined, but not necessarily equal, spacing from each other.

A flight data acquisition recording system embodying the present invention will now be described in greater detail, by way of example, with reference to the accompanying drawings, in which:

DESCRIPTION OF THE PREFERRED EMBODIMENT

Figure 1:
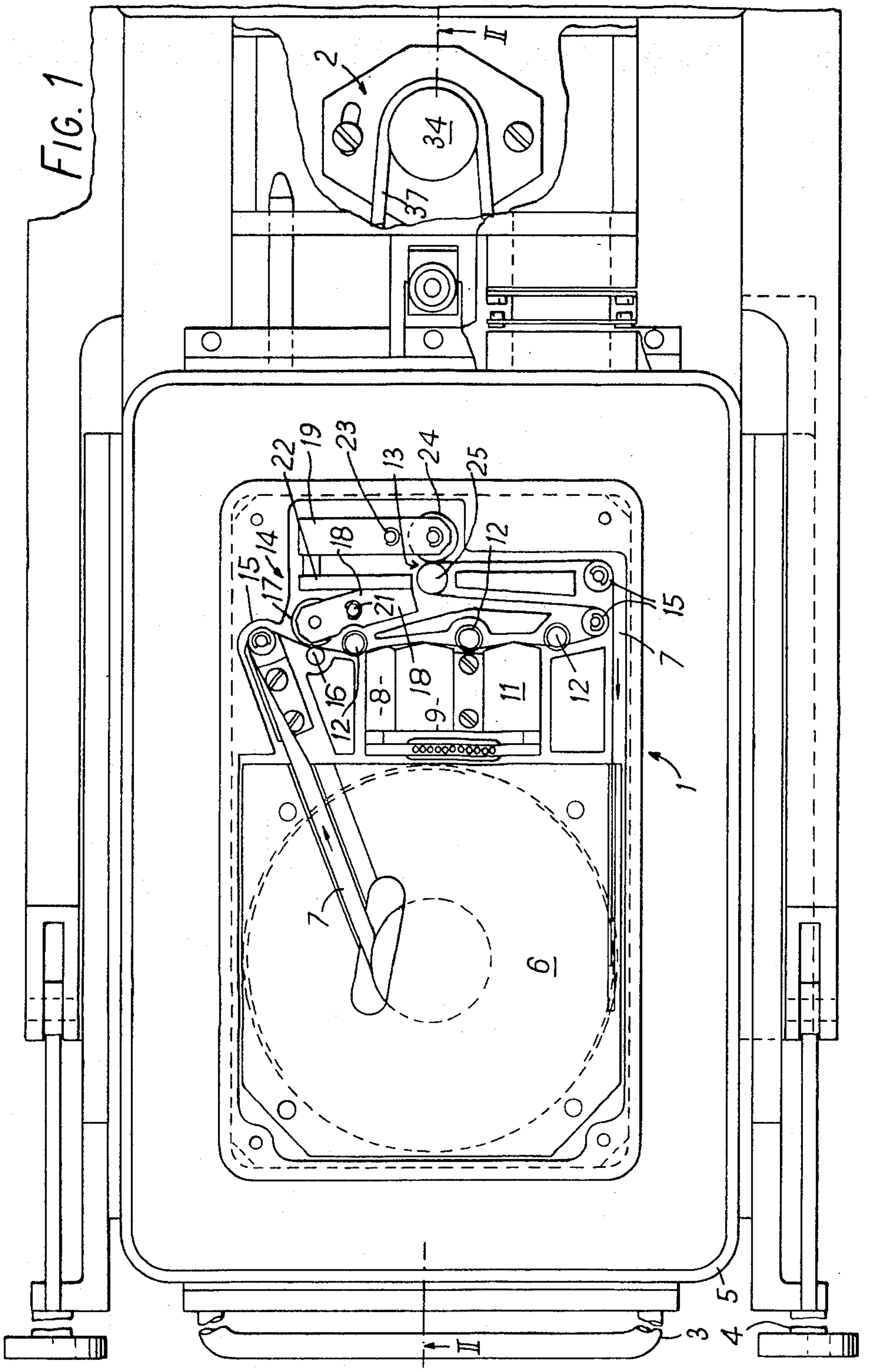
FIG. 1 is a plan view of the system with certain parts removed.
Figure 2:
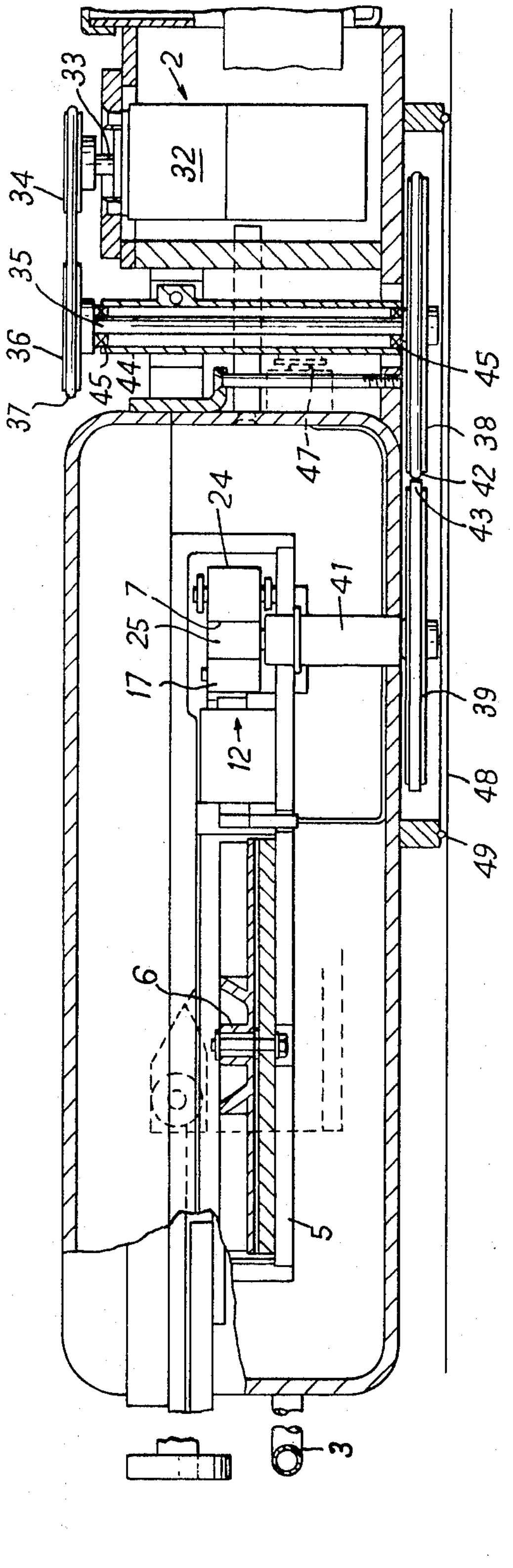
FIG. 2 is a section on line II — II of FIG. 1.

Referring in particular to FIGS. 1 and 2, the system comprises an endless loop tape recorder unit 1 which is detachable from the remainder of the system which includes drive means indicated generally at 2. For ease of detachment and assembly, the recorder unit 1 is provided with a handle 3 and releasable locking means 4 are provided to secure the unit in position in an aircraft in which the system is fitted.

The recorder unit comprises a tape deck 5 on which are mounted a spool 6 of tape 7, sets of ERASE, WRITE and MONITOR magnetic heads 8, 9 and 11, respectively, three tape guides 12, a capstan-type tape drive 13 and a tape-tensioning device 14. The tape 7 is pulled from the centre of the spool 6 and returned to the latter at the periphery thereof after having passed over a roller 15, the tape-tensioning device 14, one of the tape guides 12, the ERASE head 8, the WRITE head 9, a further tape guide 12, the MONITOR head 11, a further tape guide 12, another roller 15, the capstan drive 13, and yet another roller 15.

The tape-tensioning device 14 comprises a post 16 mounted on the tape deck 5 and a cooperable pinch roller 17 mounted at one end of one arm 18 of a pair of arms 18, 19. The arm 18 is pivotally mounted about a pivot 21 and has an extension 22. The other arm 19 is also pivotally mounted about a pivot 23 and carries at one end a pinch roller 24 forming part of the capstan drive 13 and cooperable with a driven capstan 25 also forming part of the capstan device 13. A compression spring 26 acts between the adjacent ends of the arms 18, 19 to urge the pinch rollers 17 and 24 in contact with the post 16 and the capstan 25, respectively. The rate of the spring 26 and the position of the pivots 21 and 23 determine the contact pressures of the pinch rollers 17 and 24, and the arms 18, 19 and the spring 26 constitute common adjustment means in this respect. The mass of each arm 18 and 19 on one side of the respective pivot is made substantially equal to the mass on the other side of the pivot to give a balanced arrangement.

The drive means 2 comprise a motor 32 (FIG. 2) with an output shaft 33 to which is connected a pulley 34, a shaft 35 carrying a pulley 36 drivingly connected to the pulley 34 via a belt 37, a flywheel 38 also carried by the shaft 35, and a flywheel 39 connected to a shaft 41 in turn connected to the capstan 25. Each of the flywheels 38 and 39 carries an O-ring 42,43 around its periphery, the O-rings being in engagement with each other to transmit drive when the recorder unit 1 is in position as shown in FIG. 1. When the recorder unit 1 is detached from the system, the flywheel 39 merely disengages the flywheel 38 and re-engages the latter when the unit 1 is reassembled. In order to accommodate manufacturing tolerances and other variations which might arise affecting the relative positions of the flywheels 38, 39, the shaft 35 is rotatably mounted in a sleeve 44 by bearings 45, the sleeve being pivotally mounted at 46. Thus when the recorder unit 1 is assembled in the system, the flywheel 38 is arranged to engage the flywheel 39 and move the latter by a small amount to the right, as seen in FIG. 2, whereby the shaft 35 pivots and the belt 27 stretches to take up this movement. The pivotal movement of the shaft 35 is restricted by virtue of the fact that the recorder unit 1 engages a stop. Detachment and assembly also breaks and makes electrical connection to the recorder unit 1 through a multi-pin plug and socket 47.

The ring 42 is of circular cross-section and the ring 43 of square cross-section to provide good contact therebetween even in the event of misalignment of the flywheels 38 and 39. As it is desirable to reduce to a minimum the ingress of ambient air to the drive means 2, the latter is sealed against the skin 48 of the aircraft, in which the system is fitted, by a sealing ring 49. Thus in humid conditions, for example, moisture is substantially kept from the drive means which moisture might otherwise adversely affect the drive between the flywheels 38, 39. Slight ingress of moisture under low temperature conditions which would normally result in icing up can can be tolerated because the contact pressure between the rings 42, 43 is sufficient to break up any ice which tends to form. The recorder unit 1 itself is fully protected both physically and against temperature variations.

Figure 3:
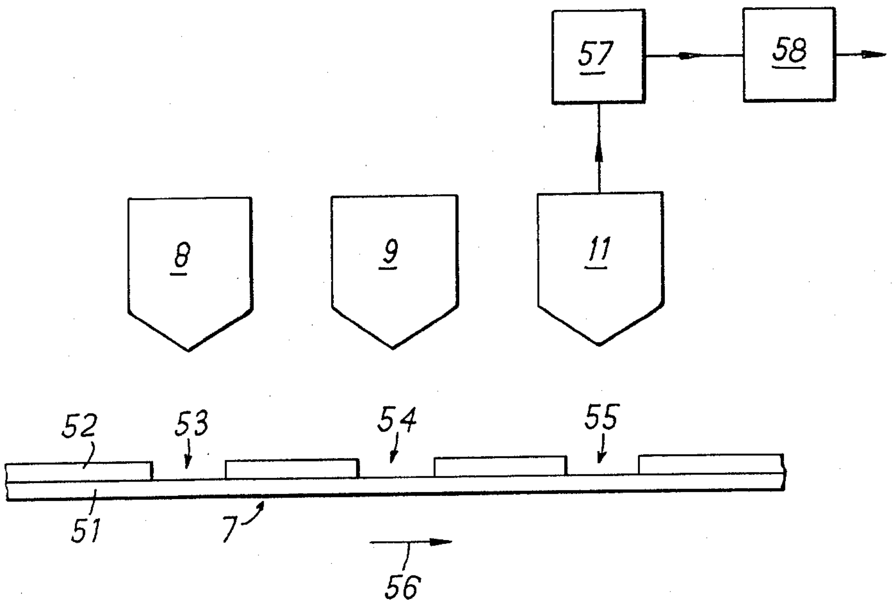
FIG. 3 is a diagrammatic representation of part of the system not shown in FIG. 1.

Referring now to FIG. 3, this shows diagrammatically the main feature of the invention which is concerned with sensing a predetermined position on the tape 7 at which it is desired to switch from one track to another on the tape for data recordal. The tape 7 comprises a base material 51 having a magnetic oxide coating 52 thereon, this coating being removed from three areas 53,54 and 55. Each of the areas 53, 54, 55 extends across the full width of the tape 7 and in the direction of movement of the tape (indicated by arrow 56) by an amount representing about one third of a second with respect to the time taken for each area to move past a given point such as the MONITOR heads 11. Also, the areas 53, 54, 55 are spaced equally from each other in the direction of tape movement 56 by an amount representing about one second of travel past the MONITOR heads 11.

Each MONITOR head 11 has its output connected to logic circuitry 57 and thence to further circuitry 58, the circuits 57 and 58 and the heads 11 together providing sensing means operable to sense the absence of the magnetic oxide coating 52 from the areas 53, 54, 55 and to produce a signal indicative thereof as will be explained.

As the first area 52 passes beneath the MONITOR head 11, the absence of data for the one third of a second period will be recognized by the logic circuitry 57 whereupon a timing signal is instigated and providing the areas 53 and 54 are recognised at the scheduled one second intervals, then the circuitry 58 is rendered operable to produce a signal to switch tracks on the tape. With the use of three areas 53, 54, 55 it is unlikely that track switching will be instigated by random loss of data, which may occur for a number of reasons, as the chances of such losses being of a duration and spaced similarly to the losses represented by the areas 53, 54, 55 are extremely low. It should be explained that an ERASE, WRITE and MONITOR head is provided for each track on the tape but that the complete set of MONITOR heads 11 is used to detect the areas 53, 54, 55.

Each MONITOR head 11 functions in the normal way to detect a fault condition on the associated track; it is arranged that when no data is detected for a period of 5 seconds a fault condition is indicated. The relative durations of the absence of data occasioned by the areas 53, 54, 55 and that occasioned by a fault condition are such that no confusion can arise therebetween. However, it will be appreciated that the actual values of these durations can be chosen at will. In normal operation of the recorder unit 1, a particular track on the tape 7 is chosen for recordal of new data and that track first passes the associated one of the net of ERASE heads 8 whereby previously recorded data is erased. The track then passes the associated WRITE head 9 which writes the new data, and then passes the associated MONITOR head 11 which checks that new data has been written. The ERASE heads 8 have their own fault detector associated therewith.

Thus the manner in which the predetermined position on the tape is detected is simple, effective and economic.

We claim:

1. A data recorder comprising a movable magnetic recording medium in the form of a base material with a coating of magnetic material thereon, the magnetic material being removed from the base material at a plurality of areas spaced in the direction of movement of the recording medium, said areas forming a predetermined pattern at a predetermined position on said medium, and sensing means including magnetic head means operable to sense the presence of said areas in accordance with said pattern passing said magnetic head means and to produce a signal indicative thereof, thereby detecting said predetermined position on said medium.

2. A recorder according to claim 1 and of the recycling tape, wherein the recording medium is in the form of a magnetic tape and the signal produced by the sensing means is used to effect reversal of the tape at said predetermined position.

3. A recorder according to claim 1, wherein the recording medium is in the form of an endless loop of multi-track magnetic tape and the signal produced by the sensing means is used to effect switching from one track to another of the tape at said predetermined position.

4. A recorder according to claim 3, wherein a set of three magnetic heads is provided for each track on the magnetic tape one of which heads provides a MONITOR function and is operable to indicate a fault condition in the absence of data on the corresponding tape track for a predetermined period of time, the MONITOR head also serving as the magnetic head means to detect the presence of said areas and produce said signal.

5. A recorder according to claim 4, wherein said signal is produced by logic circuitry to which each MONITOR head is connected.

6. A recorder according to claim 5, wherein said areas are spaced from each other in the direction of tape movement by a predetermined amount.

7. A recorder according to claim 1, wherein said areas are of predetermined length and of predetermined spacing therebetween in said direction of movement of said recording medium and said sensing means includes logic circuitry responsive to said magnetic head means for producing said signal in accordance with said areas of predetermined length and of said predetermined spacing passing said magnetic head means.

* * * * *